United States Patent [19]
Tajima et al.

[11] 3,937,640
[45] Feb. 10, 1976

[54] PROCESS FOR MANUFACTURING A WATERPROOFING ASSEMBLY OF LAMINATED BITUMINOUS ROOFING MEMBRANES

[75] Inventors: Eiichi Tajima; Kaname Yamamoto; Takayoshi Imai, all of Tokyo, Japan

[73] Assignee: Tajima Roofing Co., Ltd., Tokyo, Japan

[22] Filed: May 8, 1975

[21] Appl. No.: 575,538

Related U.S. Application Data
[62] Division of Ser. No. 331,602, Feb. 12, 1973, abandoned.

[30] Foreign Application Priority Data
Feb. 19, 1972  Japan.............................. 47-16906

[52] U.S. Cl. ..................... 156/71; 52/518; 52/622; 156/210; 156/219; 156/278; 260/28 R; 427/186; 427/413; 427/417; 428/489; 428/906
[51] Int. Cl.² ........................................... E04B 7/00
[58] Field of Search :............ 156/71, 278, 210, 219; 428/489, 906, 141; 260/28; 427/186, 417, 413; 52/173, 622, 518

[56] References Cited
UNITED STATES PATENTS
3,111,787   11/1963   Chamberlain....................... 156/337
3,672,951   6/1972   Moore ................................ 156/71

*Primary Examiner*—Edward G. Whitby
*Attorney, Agent, or Firm*—Woodhams, Blanchard and Flynn

[57] ABSTRACT

A novel self-adhesive type multi-layer laminated bituminous roofing membrane suitable for the formation of the roofing or waterproofing layer on roofs, floors and the like is provided. It comprises a base sheet of a sheet-like material, one or more bitumen layers coated on all or part of one or both faces of the base sheet, at least one layer of compound bitumen including both bitumen and rubber and/or resin laminated on all or part of the surface of said bitumen-coated layer on the base sheet and at least one release sheet laid over the whole surface of said compound bitumen layer.

This roofing membrane is produced by uniting the bitumen-coated base sheet and the compound bitumen-coated release sheet, and can be applied over a substrate in a simple manner, without the step of melting or liquefying bitumen as in the conventional application process.

3 Claims, 18 Drawing Figures

PROCESS FOR MANUFACTURING A WATERPROOFING ASSEMBLY OF LAMINATED BITUMINOUS ROOFING MEMBRANES

This is a division, of application Ser. No. 331 602, filed Feb. 12, 1973 now abandoned.

This invention relates to a self-adhesive type multi-layer laminated bituminous roofing membrane which may be simply and easily applied in the built-up system roofing or waterproofing work on the tops of buildings, floors and walls of basements, surrounding walls of underpasses and subways, tunnels, bridges, reservoirs, canals and the like. This invention also relates to processes for producing and applying the laminated bituminous roofing membrane.

The terms "bituminous" and "bitumen" as used throughout this specification may be replaced with the term "asphalt" which substantially means petroleum asphalt.

Heretofore, the conventional built-up system application process in which the ordinary type bituminous roofing felt and/or similar type bituminous roofing membranes and bitumen itself are used as the principal materials has been widely adopted for the roofing or waterproofing work set forth above.

The ordinary type bituminous roofing felt or membrane used in this application process, generally, comprises: a base sheet of a sheet-like material such as, for example, paper, felt, fabric, synthetic polymer film or metal foil; a bitumen layer coated on one or both faces of the base sheet, and; mineral granules or powder such as fine gravel, sand or talcum deposited to the surface of the bitumen layer. This ordinary type bituminous roofing membrane is in general produced in the following manner.

First, a base sheet such as, for example, paper, felt, woven or non-woven fabric, glass fleece, synthetic polymer film or metal foil, is coated with molten bitumen on one or both faces thereof to form surface layer(s) of bitumen of a suitable thickness. When a fibrous sheet such as paper, felt, woven or non-woven fabric or glass fleece, is employed as the base sheet, the fibrous sheet may be impregnated with molten bitumen prior to the coating so that the voids existing in the fibrous sheet are filled with bitumen. When a synthetic polymer film or a metal foil is employed, this base sheet may be subjected to surface treatment, prior to the coating, so as to improve its affinity for bitumen.

Secondly, in order to suppress the stickiness of bitumen, mineral granules or powder such as fine gravel, sand or talcum are deposited on the bitumen-coated surface. Alternatively, a thin film or foil surfacer of synthetic polymer or metal is adhered to the bitumen-coated surface layer. The employment of the thin film or foil surfacer depends upon the intended use.

Finally, the sheet so treated is cooled to the ambient temperature by means of, for example, coming in contact with rotating cooling drums to solidify the bitumen. The resulting finished product is stored and handled in the form of rolls or piles.

The mineral granules or powder or the thin film or foil surfacer applied in the above process is useful for preventing the bitumen surface layers sticking to each other during storage and handling in the form of rolls or piles. This also is useful, in some cases, for protecting the exposed bitumen surface layer after the bituminous roofing membrane is applied on site.

In the conventional built-up system of the application process set forth above, the formation of the bituminous roofing or waterproofing layer is performed as follows. Molten bitumen, which is by nature in the form of solid matter at ordinary room or outside temperatures, heated up to a temperature of approximately 200°C or more is coated or poured onto a substrate. Then, the above-mentioned ordinary type bituminous roofing membranes are spread over the said bitumen on the substrate, while the bitumen layer is still hot and maintains sufficient fluidity and tackiness, whereby the bituminous roofing membranes are stuck on the coated or poured bitumen layer. As a general rule, the above step may be repeated as many times as occasion demands. Thus, these bituminous materials are formed into a watertight roofing or waterproofing layer which comprises laminates of bitumen layers as the waterproof substance and bituminous membranes as reinforcement thereof, both being alternately piled up one after the other.

Accordingly, this prior process of application necessarily involves a step of heating bitumen to the molten state, which is inevitably accompanied by material or immaterial requirements such as enlarged space and increased equipment, labor, fuel and time. Increased costs maturally also accompany these requirements. Furthermore, this conventional application process is not free from various problems such as risk of a fire accompanying the step of heating bitumen, possibility of human injury such as a burn occurring during the steps of transporting and handling the hot molten bitumen, air polution, especially in city areas, due to smoke and fumes, and offensive smell generated from molten bitumen. Moreover, deterioration in the properties of bitumen itself caused by the continued heating at high temperatures offers a problem that cannot be overlooked in the point of adverse effects, which results in built-up roofing or waterproofing layers of deteriorated characteristics.

In order to obviate these problems, various attempts have been made to utilize a so-called cold application process in which several types of bitumen liquefied without heating i.e. in the form of a solution in a suitable solvent or an aqueous dispersion, are applied at a normal ambient temperature instead of the above molten bitumen. However, this cold application process has not prevailed as widely as might be expected because it still has some problems from the technical and economic points of view.

The object of the present invention is to obviate these problems of the aforementioned conventional built-up system bituminous roofing or waterproofing works, namely, to provide a novel bituminous roofing membrane, which can be applied in a simple manner without coating or pouring aforesaid bitumen, and a process for production thereof.

Another object of this invention is to provide a novel application process of built-up system bituminous roofing or waterproofing work wherein the step of melting or liquefying bitumen is not adopted, which step has previously been indispensable to the conventional application process.

Various further and more specific objects, features and advantages of this invention will appear from the description given below.

In accordance with this invention, there is provided a novel multi-layer laminated bituminous roofing membrane comprising, in combination, a base sheet of the ordinary bituminous roofing membrane having at least one bitumen-coated layer on all or part of at least one face thereof, at least one compound bitumen layer of a high tackiness including both bitumen and rubber and/or thermoplastic resin compatible with bitumen incorporated into the bitumen, the compound bitumen layer being laminated on all or part of the surface of said bitumen-coated layer on the base sheet, and at least one release sheet laid over the whole surface of said compound bitumen layer.

There is also provided a process for producing the multi-layer laminated bituminous roofing membrane described above, which comprises the steps of:
 a. coating all or part of at least one face of the base sheet of the ordinary bituminous roofing membrane with molten bitumen;
 b. coating the releasable surface of a release sheet with a molten compound bitumen of improved tackiness including both bitumen and rubber and/or resin, and;
 c. then uniting the surface of the compound bitumen layer on the release sheet with all or part of the bitumencoated surface of the base sheet.

In the above step (a), when the base sheet is composed of fibrous material, if desired, the base sheet may be impregnated with molten bitumen prior to the base sheet being coated with the molten bitumen as set forth above. When the base sheet is composed of a synthetic polymer film or metal foil, the base sheet may be subjected to surface treatment prior to the coating as described above.

There is further provided a process of application of the multi-layer laminated bituminous roofing membrane set forth above in roofing or waterproofing work, which comprises the steps of:
 a. laying the multi-layer laminated bituminous roofing membranes over a substrate in a manner such that said laminated bituminous roofing membranes at least partially overlap each other;
 b. removing the release sheet from said laminated roofing membranes at the overlapped area of the laminated roofing membranes so that the exposed compound bitumen layers are in close direct contact with one another, and;
 c. then allowing the compound bitumen layers to be united with each other at ambient temperature at the overlapped area to form a continuously spread unitary roofing or waterproofing layer.

Some waterproofing membranes which are apparently similar to that of this invention have been heretofore proposed. For example, one waterproofing membrane comprises a sheet of synthetic rubber such as butyl rubber (IIR) having a pressuresensitive adhesive thin layer, coated on one face thereof, and a release sheet stuck to the adhesive layer. Another one comprises a film of synthetic polymer such as polyethylene having only a coated layer of bitumen compounded with rubber or the like on one face thereof, and a release sheet stuck to the coated layer.

However, there is a great difference between these known membranes and that of this invention in not only the structure of the product and the method of manufacture and application thereof, but also the basic idea of forming the waterproofing layer. These known membranes and processes of application are directed to a so-called "mono-layer waterproofing system." That is, the built-up roofing or waterproofing layer is composed of a single layer except at the area where the membranes join with one another.

Moreover, the pressure-sensitive adhesive layer or the compound bitumen layer of these membranes functions only to join the membrane to a substrate or to other membrane at the overlapped area, and the principal water-stopping function of these built-up roofing or waterproofing layers solely depends on the rubber sheet or synthetic polymer film itself.

Accordingly, the application system of these membranes does not come within the same category of the conventional bituminous roofing or waterproofing application system and the present invention system, wherein plural bituminous membranes used as reinforcement are alternately laminated with bitumen layers which act as waterproof substance on which the water-stopping function principally depends.

Both of the conventional application system and the present invention system have considerably high reliability because they are, in general, lacking in any defect in water-tightness, even if the poor application work is performed on these systems. This advantage of reliability is derived from the composition itself of said systems, that is the integrated multi-laminates piled up on site.

On the contrary, the aforementioned mono-layer type waterproofing system does not have the same reliability as the above conventional application system because it may have possible defects derived from incidental faulty application work and rather poor durability of the adhesive layer. These defects mainly appear at the joints of the membranes wherein only a poor water-stopping function can be expected owing to the thin adhesive layer of said membrane. It is scarcely possible to prevent such defects by any means because the defects are due to the application being just a single layer process.

Furthermore, in case a relatively thick layer of the compound bitumen is solely coated on the sheet or film in order to insure the same water-stopping or waterproofing function as that of the conventional type bituminous roofing or waterproofing layer, the resultant membrane has the following serious defect. Namely, when the waterproofing layer composed of these membranes having a relatively thick layer of the compound bitumen alone is subjected to some external force, the compound bitumen at the forced area easily flows away, whereby the forced area of the waterproofing layer loses the waterproofing function for the most part. This phenomenon is derived from the physical properties of the inherently softness of the compound bitumen.

On the other hand, the waterproofing membrane of this invention does not lose, even when subjected to such an external force, the waterproofing function thereof, because the membrane has, besides the compound bitumen layer, the ordinary bitumen layer(s) on the base sheet as the principal material composing the waterproof substance similar to the case of conventional type built-up bituminous roofing or waterproofing layers. In the multi-layer laminated bituminous roofing membrane of this invention, the compound bitumen layer is employed only for the purpose of joining or adhering the membranes of this invention with each other or to the substrate and, consequently, it may be limited to just such a thin layer as is required for the purpose. This advantage concerning the thickness of the compound bitumen layer which is relatively expensive provides a definite economic benefit to this invention.

The laminated bituminous roofing membranes of this invention are capable of being built-up into a roofing or waterproofing layer having entirely the same superior function and reliability as is provided by the conventional bituminous roofing or waterproofing layer which comprises a plurality of alternately piled up layers of bitumen and its reinforcement membranes. This excellent function and sufficient reliability are available even though the application process according to this invention is completely different from the conventional application process in the point that no molten or liquefied bitumen is used by this invention at the construction site as described above.

This invention will be illustrated in detail with reference to the accompanying drawings showing the preferred embodiments but is not intended to be limited to these drawings.

The base sheet which is used as the base material in the preparation of the multi-layer laminated bituminous roofing membrane according to this invention, may be selected from those which have recently come into use for the ordinary bituminous roofing membrane, such as for example a glass fleece or a nonwoven fabric of synthetic fiber; as well as those which have widely been heretofore used for the same, such as paper, felt, fabric or cloth composed of organic or inorganic fiber, for example, rag felt, asbestos felt, cotton fabric or jute cloth. When these fibrous sheets are used as the base sheet, they are, as a general practice, impregnated with molten bitumen whereby the voids existing therein are filled with molten bitumen, before the base sheet is subjected to coating with molten bitumen in the process of this invention as in the case of the ordinary bituminous roofing membrane. The base sheet may be also selected from the film or foil sheets made of synthetic polymer or metal such as for example a polyester film or an aluminum or copper foil, all of which have also been heretofore used as the base material of the ordinary bituminous roofing membrane. When such film or foil sheets are used, there is no need of the pre-impregnation treatment set forth above, but where necessary, those sheets may undergo suitable physical or chemical treatment, such as for example so called sand blasting, etching and the like, so as to give their surfaces a good affinity with bitumen, before being subjected to coating with molten bitumen in the process of this invention.

As shown in FIGS. 1A, 1B, 1C and 1D, the base sheet 6 of the laminated roofing membrane 26, is coated on all or part of both or one face thereof with bitumen 8, and all or part of said bitumen coated layer is laminated with compound bitumen 20 that is denatured bitumen prepared particularly to impart high tackiness at ambient temperature thereto by blending natural or synthetic rubber and/or natural or synthetic resins.

These blending materials can be selected from any of those well-known as adapted to denature and improve ordinary bitumen (in its physical properties especially in the temperature susceptibility). Namely, as for rubber, they include, for example, vulcanized or non-vulcanized rubber out of various kinds of synthetic rubber such as styrene-butadiene rubber (SBR), acrylonitrile-butadiene rubber (NBR), chloroprene rubber (CR), butadiene rubber (BR), isoprene rubber (IR), butyl rubber (IIR), ethylene-propylene rubber (EPR), ethylene-propylene diene mar (EPDM), polyisobutylene (PIB), chlorinated polyethylene (CPE), etc.; and natural rubber (NR), and reclaimed rubber thereof. Next, as for natural or synthetic resins, they include, for example, resin or its derivatives (e.g. estergum), tall oil, cumarone-indene resin, various petroleum resins, polyolefin (e.g. polybutene), etc.

In the practice of the present invention, it has been found that only a very small amount of rubber and/or resin needs to be present in the compound bitumen layer in order for at least a small amount of benefit to be obtained. However, generally for most uses a relatively high degree of tackiness is desired. Therefore, generally at least about 5% by weight, based on the weight of the compound bitumen, of rubber and/or resin should preferably be present in the compound bitumen layer. While there is apparently no critical upper limit with regard to the amount of rubber and/or resin that can be used to effectively improve the tackiness, at most about 95% by weight of rubber and/or resin should preferably be in general used because of the facilitation of the production process of the laminated roofing membrane and cost considerations thereof. For optimum results, it is preferred that the total amount of rubber and/or resin present in the compound bitumen layer is within the range of 15 to 50% by weight.

Furthermore, if desired, these rubber and resins may be partially substituted with animal or vegetable oils and fats, because in general these oils and fats also are considerably effective for increasing the tackiness of bitumen. These oils and fats include, for example, animal oils and fats such as fish oil, whale oil, beef tallow and the like; and vegetable oils such as linseed oil, tung oil, sesame oil, cotton seed oil, soya-bean oil, olive oil, caster oil and the like. These oils and fats may be, for example, stand oil, oxidized oil and boiled oil, made therefrom; and fatty acid pitch or the like. The amount of these oils and fats is preferably below approximately 50% by weight based on the weight of the total amount of rubber and/or resin and the oils and fats.

Some additives, for example, softener such as petroleum oil, filler such as mica powder, and the like can also be incorporated into the compound bitumen.

Release sheets 14 and 15, which are laid over the surfaces of the compound bitumen 20, are those which have little or no affinity with respect to the compound bitumen and are easily and readily removable from the compound bitumen layer by manually peeling them therefrom at ordinary ambient temperatures. Practically, the release sheets include, for example, sheet materials in the form of an untreated sheet such as cellophane, polyvinylalcohol film and aluminum foil, or in the form of a treated sheet such as film, foil, paper and the like subjected to surface-treatment i.e. coated or impregnated with synthetic resins having high releasing property such as silicone resin, fluorine-containing resin or polyvinylidene chloride. Especially, the sheet coated or impregnated with silicone resin on the surface thereof is most preferable in use because of its releasability and cost.

In the case where the release sheets have poor elongation property, when these release sheets are laid over the compound bitumen layers on both faces of the laminated bituminous roofing membrane, the resulting finished product of the laminated roofing membrane is deprived of its flexibility and thus comes to be practically as rigid as a board. Consequently, it becomes extremely difficult to wind up the product in the form of a roll as the ordinary type bituminous roofing felt or membrane is usually found. If subjected to forced rolling, the product is deeply creased in many places with irregular wrinkles, folds and/or cracks. Additionally, even if such a release sheet is laid over the compound bitumen layer on only one side face of the laminated roofing membrane, the creasing with irregular wrinkles cannot be avoided, though the wrinkles are somewhat slight.

Figure 1A:
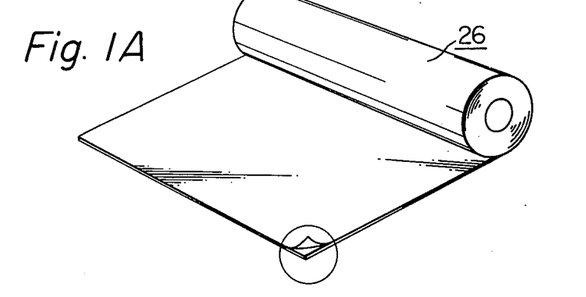
FIGS. 1A, 1B, 1C and 1D are explanatory views showing the structures of the laminated bituminous roofing membranes of this invention.
Figure 1B:
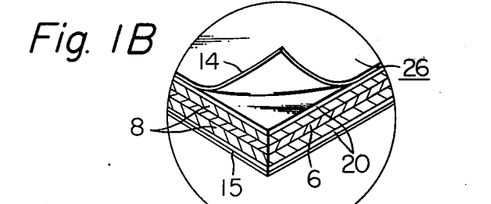
Figure 1C:
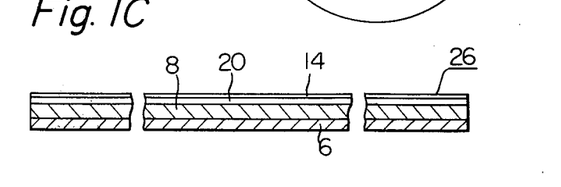
Figure 1D:
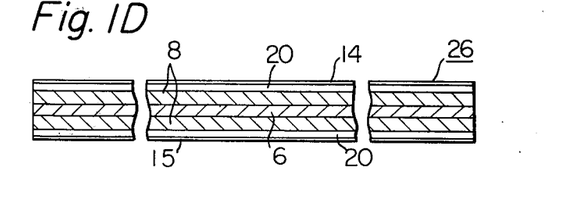
Figure 2A:
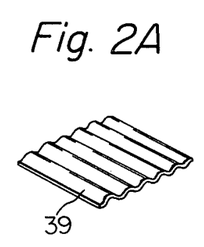
FIGS. 2A and 2B are explanatory views showing preferred release sheets employed in the laminated bituminous roofing membrane of this invention.
Figure 2B:
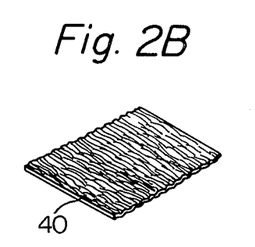

In order to obviate this problem, it is preferable to increase the elongation of the release sheet in a lengthwise direction, i.e. the wind-up direction. Thus it is advantageous for that purpose to form a plurality of linear folds or creases on the release sheet itself along the direction which is substantially perpendicular to the lengthwise direction, and practically, it is advisable to use, for example, a release sheet subjected to embossing whereby the sheet is shaped into a corrugated form, as shown in FIG. 2A at 39, or a release sheet prepared from a base sheet of creped paper as shown in FIG. 2B at 40. In this case, since the release sheet is provided with sufficient elongation in the lengthwise direction by the procedure thus taken, the roofing membrane overlaid with the release sheet is capable of maintaining sufficient flexibility through its adaptation to the expansion and contraction during the rolling or unrolling operation, and thus can completely prevent the problem pointed out above.

Figure 3A:
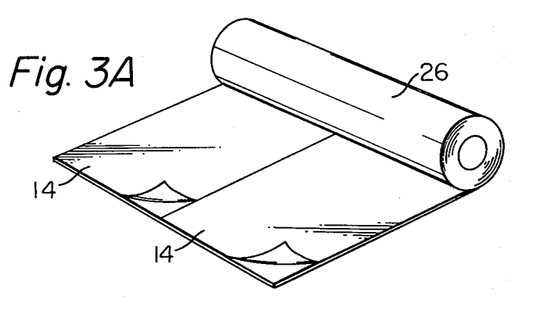
FIGS. 3A and 3B are explanatory views showing preferred laminated bituminous roofing membranes of this invention.
Figure 3B:
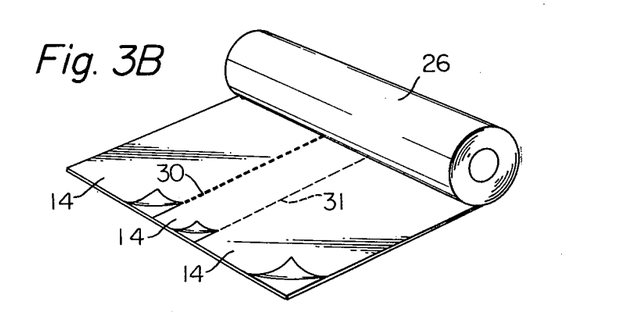

Furthermore, when the release sheet is applied in such a manner that a plurality of narrow strips thereof are laid over the compound bitumen layer in aligned relation to one another in a lengthwise direction as shown in FIG. 3A at 14, or a single or plural rows of perforations 30 or notches 31 are formed in the sheet as shown in FIG. 3B, so as to permit partial removal of the release sheet from the surface of the compound bitumen layer at the construction site as required, the application work is conveniently rendered easier.

Figure 4A:
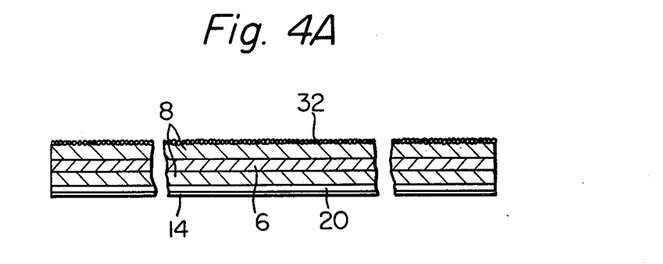
FIGS. 4A, 4B and 4C are explanatory views showing various modified models of the laminated bituminous roofing membranes of this invention.
Figure 4B:
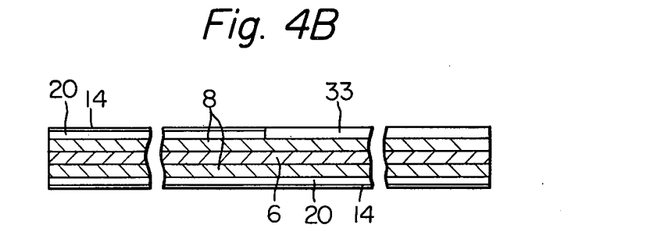
Figure 4C:
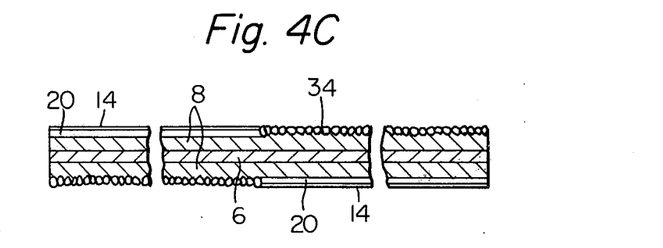

The laminated bituminous roofing membrane of the invention is available in such various modified models as shown in FIGS. 4A, 4B and 4C, for meeting various objects or systems of application, besides that set forth above with reference to FIG. 1. In FIG. 4, the reference numerals 6, 8, 20 and 14 indicate a base sheet, an ordinary bitumen-coated layer, a compound bitumen layer, and a release sheet, respectively, which are similar to those in FIG. 1. The reference numerals 32, 33 and 34 indicate fine sand or talcum, a synthetic polymer film or metal foil, and coarse sand or fine gravel, respectively.

The process for producing the laminated roofing membrane of the invention will be now illustrated in detail with reference to FIG. 5, which shows only a typical example of the production process of this invention.

Figure 5:
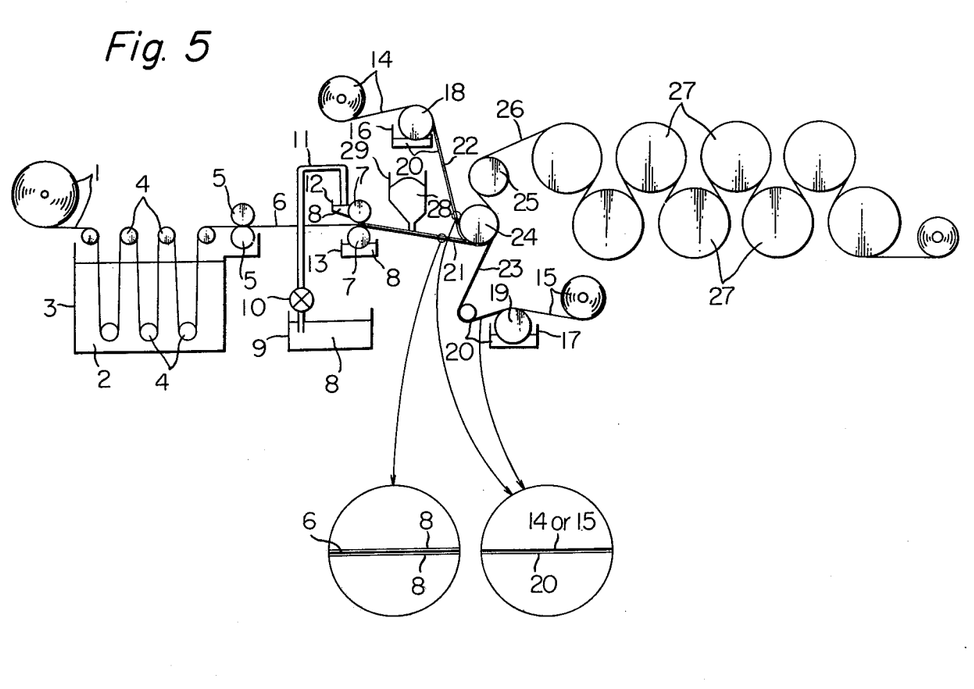
FIG. 5 is an explanatory view showing the process of producing the laminated roofing membrane of this invention.

As shown in FIG. 5, a fibrous base sheet 1 which is used as a core material of ordinary bituminous roofing felt or membranes, such as paper, felt, woven cloth, non-woven fabric or mat, is unwound from a roll, and then immersed into molten straight-run or oxidized bitumen 2 maintained at approximately 200°C in a bath 3. After the base sheet 1 is impregnated with molten bitumen 2 while passing through several guide rollers 4, the excess bitumen is squeezed out by a pair of squeezing rollers 5. When a synthetic polymer film or a metal foil is used as a base sheet instead of the above fibrous base sheet, the step of impregnation with bitumen is omitted.

The impregnated fibrous sheet or the film or foil sheet 6 passes through a pair of coating rollers 7 which are placed in parallel to each other with a clearance wider than the thickness of the sheet 6, for example, approximately 2 – 3 mm, in conformity to desired thickness of the coating bitumen. Thus each face of the sheet 6 is coated with molten bitumen 8, preferably consisting mainly of oxidized bitumen, maintained at approximately 220°C, which is continuously supplied to the coating rollers 7. A reservoir 9, pump 10, conduit 11, overflow trough 12 and sump 13 constitute a series of conventional attached devices adapted to make continuous supply of the molten bitumen 8 to the coating rollers 7.

On the other hand, both release sheets 14 and 15, such as paper or film sheets which have been previously treated on the surface by coating or impregnating with silicone resin or the like, are unwound from rolls. These release sheets 14 and 15 are separately conducted to respectively independent roller coater assemblies which consist of sump 16 or 17 and roller 18 or 19, for applying molten compound bitumen 20. The molten compound bitumen 20 contains a desired amount, for example, approximately 20% by weight, of rubber and/or resin and is maintained at approximately 200°C. Thus, the release sheets 14 and 15 are coated on their releasable face with the compound bitumen so as to form the coated layers of a suitable thickness, for example, approximately 0.3 – 0.5 mm. These roller coater assemblies may be replaced by any other types of coating devices, which are well-known as suitable for the coating of materials of high viscosity, such as, for example, a multiple roller type or a doctor blade type. In order to supply the molten compound bitumen 20 to the coating assemblies, there are provided attached devices (not shown in the drawing) similar to the attached devices 9, 10 and 11 described previously.

The base layer 21 formed by coating the base sheet 6 with the bitumen 8 as mentioned above is laminated on each surface thereof with two sheets 22 and 23 constituted with the release sheets 14 and 15 each having a compound bitumen coated layer thereon. This lamination is carried out in a manner such that the bitumen coated layer on both faces of the base layer 21 and the compound bitumen coated layer on the sheets 22 and 23 face each other respectively so as to be in close contact, and then, the base layer 21 and the two sheets 22 and 23 pass through pressing rollers 24 and 25, where they are united together by dint of their tackiness.

Thus, the bitumen 8 coated on the base sheet 1 and the compound bitumen 20 coated on the release sheets 14 and 15 are easily and securely laminated to each other without any influence on uniformity thereof, however they are in a molten or fluid state at high temperature, because of sufficient effect of "carriers," that is, the base sheet 1 and the release sheets 14 and 15.

Then, a resultant laminated roofing membrane 26, having the laminated layers of both bitumen and the compound bitumen on the surface thereof, passes in turn, through several cooling drums 27 while being in close contact therewith, and thereby is cooled and solidified gradually. Finally, the laminated roofing membrane is wound up in the form of a roll.

In an arrangement shown in FIG. 5, known accumulator means such as loopers, festoons or floating loopers may preferably be employed at the positions such as, for example, between the scroll of the base sheet 1 and the impregnating device consisting of the bath 2, the molten bitumen 3 therein, and the guide rollers 4; between the squeezing rollers 5 and the coating rollers 7; and between the last cooling drum 27 and the roll of the product, although these accumulator means are not shown in FIG. 5. The employment of these accumulator means is advantageous for facilitating the processing work and accelerating the cooling action during the time of production.

In a modified embodiment of the production process of this invention, a laminated roofing membrane having the compound bitumen layer coated on only one face of the bitumen-coated base sheet 6 as shown in FIG. 4A is manufactured in the following manner. Mineral granules or powder 28 is deposited on either face of the molten bitumen-coated base layer 21 by a suitable known device shown in FIG. 5 with numeral 29. In this procedure, the supply of one release sheet shown in FIG. 5 with numeral 14 is omitted. Alternatively, a thin surfacer shoot such as a synthetic polymer film or a metal foil may be closely adhered to either face of the molten bitumen-coated base layer 21 instead of the mineral granules or powder mentioned above, although this embodiment is not shown in FIG. 5.

As an another modified embodiment of the production process of the invention, a laminated roofing membrane having the compound bitumen layer coated on only the part extending along the lengthwise direction of either or each face of the bitumen-coated base sheet as shown in FIGS. 4B and 4C may also be manufactured in the following manner. The molten compound bitumen-coated release sheet having a width narrower than the bitumen-coated base sheet is laminated on the part of the bitumen-coated base sheet, and granules or powder is deposited, or the thin sheet is closely adhered, on the remaining part of the bitumen-coated base sheet.

In the production process of the invention, the release sheets 14 and 15 may preferably be subjected to creping or embossing, prior to the application of the compound bitumen thereon, thereby to form linear folds or creases along the direction perpendicular to the lengthwise direction. Thus, the resultant laminated roofing membrane are conveniently increased in flexibility to thereby prevent the undesirable formation of irregular wrinkles, folds and/or cracks thereon during rolling or unrolling operations, as aforementioned.

The laminated roofing membrane produced by the process of the invention have a stratiform (or stratified) structure wherein both the bitumen-coated layer 8 and the compound bitumen layer 20 are bonded to each other and extend with uniform thickness, as shown in section in FIGS. 1C, 1D, 4A, 4B and 4C.

The features of the production process of this invention will be explained in comparison with that of the ordinary bituminous roofing felt or membrane.

In the production process of the ordinary bituminous roofing felt or membrane as set forth hereinbefore, if the depositing of the granules or powder or the adhering of the thin film or foil surfacer is omitted, the aforesaid cooling means such as contact with the rotating drums cannot be adopted because of a very high tackiness of molten bitumen at high temperature. In this case, therefore, alternative cooling steps are required wherein the bitumen layer is left in the atmosphere to be spontaneously cooled, or cold air is blown upon the bitumen layer. These steps are obviously disadvantageous, because there is need of a large area and a long time, inevitably leading to reduction of the efficiency and increase in the cost of production.

On the other hand, it is impossible to produce the multi-layer laminated bituminous roofing membrane of this invention by a process of directly spreading the hot compound bitumen in a molten state at a uniform thickness on the hot bitumen layer on the base sheet, which layer is also in a liquid or semi-liquid state, by well-known coating means such as roller coating or doctor blade spreading because of high fluidity of the hot bitumen layer on the base sheet. It would also be impossible to directly spread the hot compound bitumen by spraying means because of the high viscosity of the molten compound bitumen.

In contrast, if the hot bitumen layer on the base sheet is covered with granules, powder, film or foil, and then cooled it would be possible to directly spread the hot compound bitumen in a molten state over the cooled surface. However, this method is not always free from the disadvantage that the presence of said granules, powder, film or foil provides a possibility of its hampering close contact of both bitumen layers or inevitably requiring an increase quantity of the compound bitumen. Consequently, this method results in undesirable effects such as reduction of the waterproofing capability and increase in the cost of production.

If the hot bitumen layer coated on the base sheet is cooled to solidification in advance without the application of granules, powder, film or foil thereon, it would be possible to coat the cooled surface directly with the molten compound bitumen by well-known means. However, this method also can not be utilized practically because the cooling of the hot bitumen layer itself is accompanied with the related problems set forth above.

The special significance of the production process of this invention resides in the fact that all of the above-mentioned problems have been completely resolved by separately and uniformly coating the molten bitumen and the molten compound bitumen, on the base sheet and the release sheet, respectively, and thereafter, laminating the bitumen layer on the base sheet and the compound bitumen layer on the release sheet to bring them into close contact with each other. In other words, the compound bitumen is not directly coated on the hot bitumen layer on the base sheet, but, firstly coated at a uniform thickness on the release sheet, and then laminated with the bitumen layer on the base sheet.

It is of great interest that the molten compound bitumen can be advantageously coated on the release sheet by wellknown coating means although the release sheet has in itself little or no affinity with the compound bitumen. This is because the compound bitumen exhibits in a molten state at a high temperature a considerably increased tackiness which is sufficient to cause it to stick on the release sheet. Further, once the laminate of the compound bitumen layer and the release sheet is cooled to an ambient temperature, the release sheet can be easily removed from the compound bitumen layer because of lack of affinity of the release sheet with bitumen. The affinity characteristic of the release sheet and bitumen, as well their capability of coexisting together, are advantageously utilized in the production process of this invention.

To sum up, the production process is of great significance in the point that the lamination in uniformity of different types of hot bitumen in a molten state with each other can be achieved easily and economically. Such lamination would be expected to be very difficult to achieve utilizing the known processes as set forth hereinbefore.

The gist of the application process of this invention resides in providing an integrated and continuous waterproofing layer at ordinary ambient temperature by utilizing the mutual cohesion property of the compound bitumen layers of the laminated bituminous roofing membranes.

The process of the application of the laminated roofing membrane of the invention will be illustrated with reference to FIGS. 6A, 6B, 7A, 7B, 8 and 9.

Figure 6A:
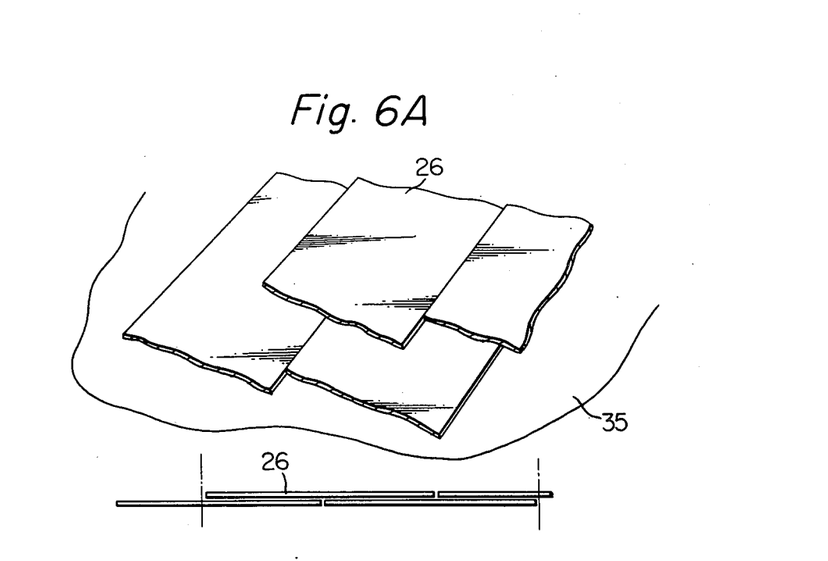
FIGS. 6A and 6B, 7A and 7B, 8 and 9 are views illustrating the processes of application of the laminated roofing membrane of this invention.
Figure 6B:
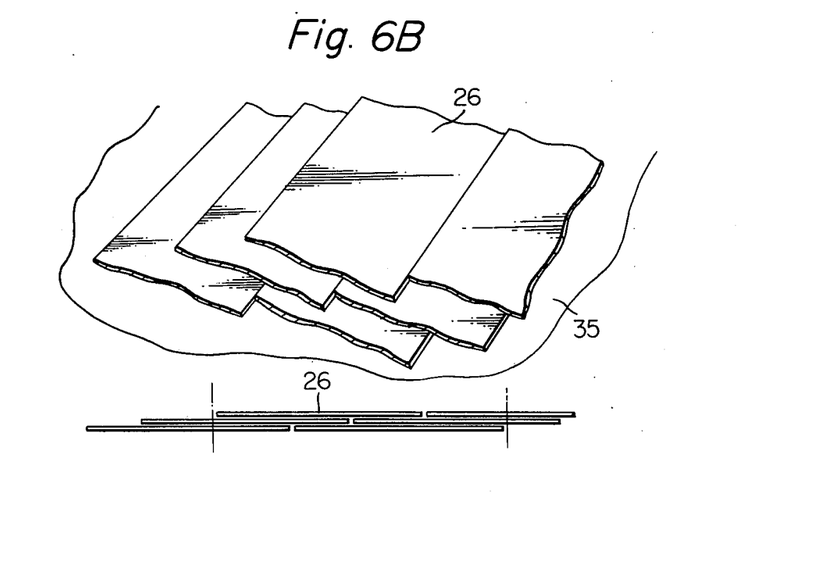

As shown in FIGS. 6A, 6B, 7A and 7B, the laminated roofing membrane 26 is laid over a substrate 35, to which a bituminous primer was applied where necessary, in advance, and dried. FIG. 6A shows one application system for two layers finishing type model, and FIG. 6B shows the same application system for three layers finishing type model. This system can be similarly applied for four, five or more layers finishing type model.

Figure 7A:
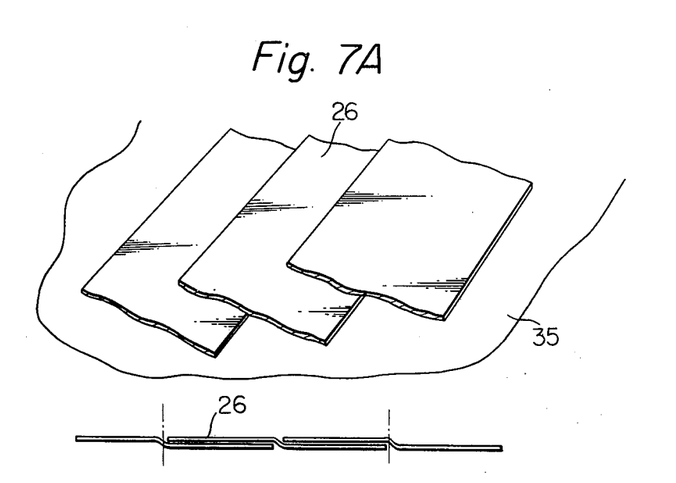
Figure 7B:
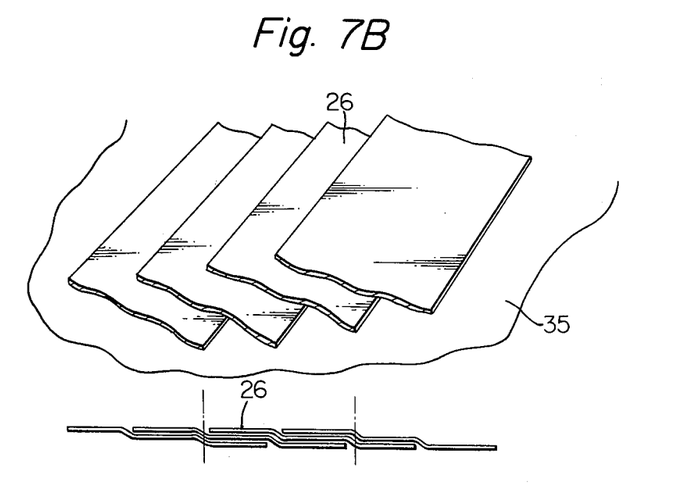

FIG. 7A shows another application system for two layers finishing type model, and FIG. 7B shows the same application system for three layers finishing type model. This system also can be similarly applied for four, five or more layers finishing type model.

In either case shown in FIGS. 6 and 7, the opposing surfaces of the laminated roofing membranes are, in principle, so provided as to be those surfaces coated with the compound bitumen. Consequently, at the time of application, upon removal from these surfaces of the release sheets laid over the compound bitumen the surfaces are brought directly into contact with each other. However, the surface of the laminated roofing membrane which is to be in contact with the substrate need not be the compound bitumen-coated layer. Particularly, in the case where it is desired to avoid entire surface adhesion between the finished roofing or waterproofing layer and the substrate, depending upon the circumstances, the surface of the roofing membrane to be in contact with the substrate may be, for example, a mineral granule of powder-deposited bitumen layer. In this case, suitable adhesive such as bituminous cement may be applied in a spot application manner onto the substrate so as to obtain a partial adhering effect, if desired. When a laminated roofing membrane having the compound bitumen layers on both faces thereof is employed, the roofing membrane may be applied onto the substrate without removing all or part of the release sheet from that portion which comes in contact with the substrate in order to get the same effect as above.

These laminated roofing membranes thus laid and piled up on the substrate by means of the above-mentioned process, if external conditions such as temperature, time and load applied to the roofing membranes are all met, are completely adhered and healed over each other in the overlapped area of the compound bitumen layer without the requirement for any additional steps to be taken because of high tackiness inherent in themselves, whereby a continuous and integrated waterproofing layer composed of multi-layers are formed on the substrate.

Figure 8:
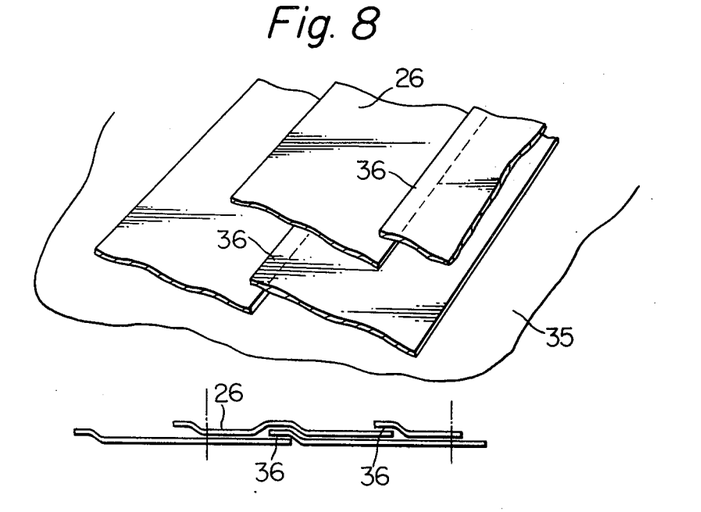
Figure 9:
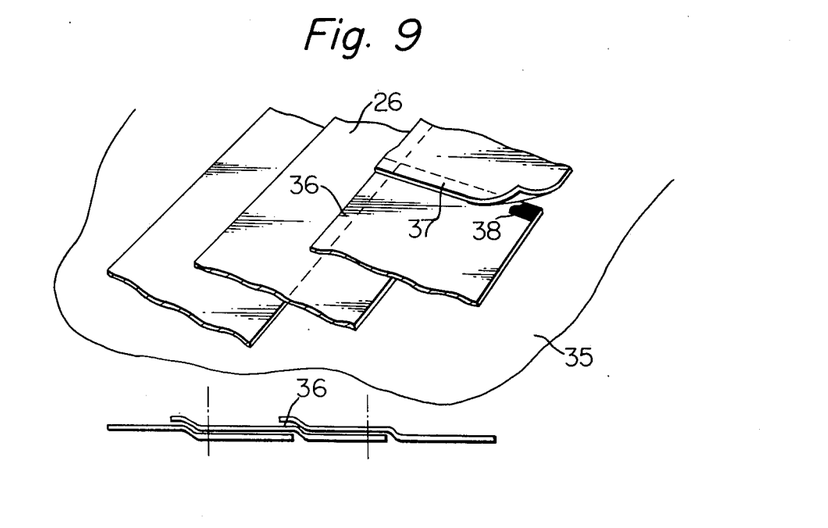

FIGS. 8 and 9 show modifications of the application systems shown in FIGS. 6 and 7, respectively. In each modification, it is intended to increase watertightness in the joint area 36 by overlapping partially the part of the waterproofing membranes. In these modifications, both of opposing surfaces of the laminated roofing membranes in only locally overlapping portions of the joint area 36 need not be the compound bitumencoated layer, but either one surface of the laminated roofing membranes may be the bitumen-coated layer deposited with granules or powder or adhered with a thin sheet. Incidentally, in this case, it is more practical and preferable that the said one surface is to be the upper side surface of the underlying laminated roofing membrane. When either one surface does not consist of the compound bitumen layer in that overlapped area 36 and in the overlapped area 37 of a joint in the lengthwise direction of the laminated roofing membranes, it is preferable to enhance the adhesion of such areas by heating that surface locally by means of burner flame or hot air so as to melt the bitumen, or by coating that surface locally with bituminous cement 38. Also, when it is required to carry out the finishing treatment of the roofing or waterproofing layer in its marginal portion or in the portions surrounding drains, corners or the like, it is preferable to enhance the adhesion of such portions by the same supplementary measures as taken above. However, the adoption of such measures for enhancing the adhesion is extremely localized in requirement, and other than such portions, with the application process of the invention, almost the whole surfaces of the membranes, as described, are completely adhered together without any particular treatment.

Additionally, when the laminated roofing membrane having a mineral granules-deposited surface or a thin sheet-adhered surface is applied so as to expose it as an outer surface, the finished layer need not be covered and protected with another material with the advantageous result of economically providing an exposure to the weather type roofing or waterproofing layer of light weight.

The gist of this application process resides in that an integrated waterproofing layer is provided by mere mutual cohesion of the compound bitumen applied to the surface layer of the laminated roofing membranes as described above. Thus, the process technique wherein molten or liquefied bitumen is applied on site is not required in the process of application of the invention, whereas the said process technique is indispensable in conventional processes of application. Therefore, the process of application of the invention can completely obviate various problems of the conventional processes of application, for example, various disadvantages accompanying the step of heat-melting bitumen in the hot process, or the technical or economic bottlenecks in the cold process, both as described hereinbefore, and moreover can remarkably facilitate and expedite the actual work involved in the application process.

In both conventional processes of application, i.e. the hot process and the cold process, the bitumen layer which is the main constituent of the waterproofing layer is in general formed by manual operation at the construction site and, therefore, control of its thickness and uniformity mainly depends on the skill and intuition of the worker, thus there has been some risk of not obtaining satisfactory results in the finished layer.

On the other hand, the application process according to the invention is free from the above mentioned risk. This is because, in this invention, both of the bitumen layer and the compound bitumen layer are mechanically formed with predetermined constant thickness and closely laminated to each other in a well-controlled state at the factory before the application on site, then they are further adhered on site without any adhesive layer so as to form an integrated bitumen layer having continuous uniform thickness after the application on site. Therefore, it is insured that this process results in neither irregularity or shortage in thickness nor gaps in the coated or poured bitumen layer, which are unavoidable when the layer is applied manually in the case of the conventional processes of application. Moreover with this process of application there is no risk of deterioration in the properties of the bitumen which often results from overheating in the step of melting bitumen at the construction site and, therefore, this process of application has the advantage of forming a waterproofing layer in a state wherein the best properties of the material are always present.

Considering this application process from a viewpoint of economy, it is more expensive than the conventional application processes in that it requires new additional elements, i.e. the compound bitumen layer and the release sheet for the roofing membrane to be used in this process. However, this proposed application process can compensate more than enough for such disadvantage of increase expenses, because it allows great reduction in labor as compared with the conventional processes, which reduction is derived from the quite different application methods of the two processes described above.

Especially, as a measure for coping with the trend of labor shortages in recent years, this application process is very suitable and advantageous. Therefore, in another manner of speaking, it may be said that a primary subject of this invention is to provide a prefabricated waterproofing layer to assist in alleviating this trend of labor shortage.

EXAMPLE 1

A laminated bituminous roofing membrane was prepared in the following manner.

Non-woven fabric of 200 g/m$^2$ in weight was made by a dry forming method from acetalized polyvinyl alcohol fiber having a mean length of 40 mm and fineness of 2 denier.

Using the apparatus shown in FIG. 5, the non-woven fabric of a 1 m width unwound from roll 1 was passed through an impregnation bath 2 containing molten blown bitumen 100/45 heated to a temperature of 200°C having a softening point (ring and ball method) of 100°C and a penetration degree of 45 at 25°C and then, squeezed with rollers 5. The bitumen-impregnated fabric was coated by a pair of coating rollers 7 with the same blown bitumen as above on each face thereof at a thickness of about 1 mm.

A release sheet was prepared in the following manner. A creped kraft paper of 90 g/m$^2$ in weight was laminated with a polyethylene film of 0.015 mm in thickness on one face and then, coated with a dilute solution of silicone resin on the said polyethylene laminated face and finally dried.

Two of the release sheets were separately coated by coating rollers 18 and 19 with the molten compound bitumen of a temperature of 180°C, composed of 80 parts of the blown bitumen 80/45 (softening point 80, penetration 45), 12 parts SBR and 8 parts petroleum resin, all by weight, at a thickness of about 0.4 mm. The compound bitumen-coated release sheet was closely adhered to each face of the bitumen coated-fabric by rollers 24 and 25. The adhered membrane was cooled by a series of drums 27 and wound up into rolls.

EXAMPLE 2

A roofing membrane was prepared in the following manner. Using a similar apparatus as that shown in FIG. 5, a glass fleece of a width of 1 m and a weight of 60 g/m$^2$ was impregnated with molten blown bitumen 110/30 heated to 210°C, then laminated to a polyester film of a width of 1 m and a thickness of 0.1 mm which was supplied to the front of squeezed rollers 5 where two sheets were adhered together with said molten bitumen, and further coated by the coating rollers 7 with the same molten bitumen on one face thereof at a thickness of 0.8 mm and on the other face thereof at a thickness of 1.0 mm, and then deposited by supplier 29 with crushed slate 28 of 10 – 20 mesh on the face having the bitumen-coated layer of 0.8 mm.

On the other hand, the same release sheet as in Example 1 was coated with compound bitumen composed of 75 parts of said blown bitumen, 12 parts of IIR, 8 parts of ester gum and 5 parts of stand oil made of mainly linseed oil, all by weight, at approximately 190°C by using the roller coated 17 and 19. Then, the release sheet was closely adhered to the bitumen coated surface of 1.0 mm and the resultant adhered membrane was cooled and wound up into rolls, in the same manner as in Example 1.

EXAMPLE 3

The laminated bituminous roofing membranes of the bilateral self-adhesive type prepared in Example 1 were unrolled and laid over a roof slab of reinforced concrete in a manner such that each membrane overlapped with other as shown in FIG. 7A. The roof slab was coated with bitumen primer of 0.3 l/m$^2$ on the previous day and dried. The roofing membranes were partially overlapped with one another about 15 cm or more in width at the joint portions of the membranes in the lengthwise direction. Each release sheet was removed from the membranes at the installation stop except for the exposed surface thereof.

Then, on their upper surface, the laminated bituminous roofing membranes of the unilateral self-adhesive type prepared in Example 2 were laid in the partially overlapping method with the crushed slate-deposited surface facing upward and with their joint overlapped areas of about 10 cm in both the lengthwise and crosswise directions. Each release sheet of the membranes and remaining release sheets on the exposed surface of the said bilateral type membranes overlaid previously, were removed from those membranes at the installation step.

The crushed slate-deposited surface of their overlapped portion was heated by flame of a gas-burner and pressed whereby the crushed slate-deposited surface was stuck to the facing compound bitumen layer. In this heating step, it was found to be preferable for fine finishing to wet the crushed slate-deposited surface besides the overlapped portions with water before heating.

When these steps were carried out, adhesion of the surfaces of the compound bitumen layers to each other was checked at three different conditions. Almost all surface of the compound bitumen layers facing each other were completely bonded together immediately at 25°C, and within 24 hours at 0°C under no load, and within one hour at 0°C under a load of 0.01 kg/cm². A continuous built-up bituminous roofing layer of 10.5 mm in mean thickness, substantially constructed of three layers of the membranes, was thus obtained.

While a few embodiments of the invention have been illustrated and described in detail, it is particularly understood that the invention is not limited thereto or thereby.

What we claim is:

1. A process for manufacturing a built-up bituminous roofing or waterproofing assembly, utilizing a self-adhesive, multi-layer, laminated, bituminous roofing membrane, comprising a flexible base sheet having on at least a portion of one surface thereof a first surface coating layer of uniform thickness applied in direct face-to-face mutually adhering contact therewith, said first surface coating layer consisting essentially of a substantially solid, waterproofing roofing bitumen; a second surface coating layer of uniform thickness superposed on said first layer and having its inner surface in direct, face-to-face, mutually cohering contact with the outer surface of said first surface coating layer, said second coating layer being of lesser thickness than said first coating layer and consisting essentially of a compound bitumen containing from about 5 to 95 percent by weight of substance selected from the group consisting of rubber, thermoplastic resin and mixtures thereof, said compound bitumen being of high tackiness at ambient temperature and being self-adhesive to the compound bitumen layer of another like roofing membrane; and a release sheet having a release surface in direct face-to-face releasably adhering contact with the outer surface of said second coating layer, comprising the steps of
   a. laying a plurality of said roofing membranes over a substrate so that said membranes partially overlap,
   b. removing the release sheets from the roofing membranes to expose the second layers thereof,
   c. placing said second layers in direct face-to-face contact and pressing said second layers together to form a waterproof joint therebetween.

2. A process as claimed in claim 1 including the steps of applying additional roofing membranes over said plurality of roofing members and repeating steps (b) and (c) to form waterproof joints between all the membranes.

3. A process as claimed in claim 2 in which said additional roofing membranes are applied so that each joint between said plurality of membranes lies between the marginal edges of at least one of said additional membranes so as to be covered thereby.

* * * * *